Oct. 18, 1932.     G. D. SCOTT     1,882,997
GEAR HOLDING AND CENTRALIZING DEVICE

Filed Feb. 9, 1931

Inventor
Gherald D. Scott

By Geo. H. Kennedy Jr.
Attorney

Patented Oct. 18, 1932

1,882,997

UNITED STATES PATENT OFFICE

GHERALD D. SCOTT, OF WORCESTER, MASSACHUSETTS, ASSIGNOR TO THE HEALD MACHINE COMPANY, OF WORCESTER, MASSACHUSETTS, A CORPORATION OF MASSACHUSETTS

GEAR HOLDING AND CENTRALIZING DEVICE

Application filed February 9, 1931. Serial No. 514,565.

The present invention relates to an improved gear holding and centralizing device that is adapted to support a toothed gear with reference to its pitch line, or circle, so that grinding or cutting operations performed on an internal opening in the gear will be absolutely concentric, or coaxial, with the pitch circle of the teeth.

The device of the present invention is particularly adapted for the support of gears having teeth with wide faces, as well as gears with teeth of the spiral or herring-bone type, as will hereinafter more fully appear from the following description, with reference to the accompanying drawing, in which:—

Like reference characters refer to like parts in the different figures.

Figure 2:
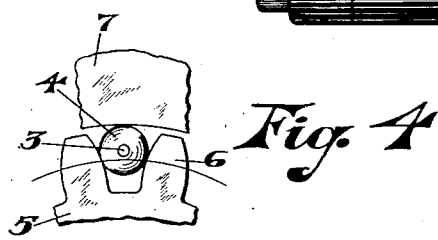
Fig. 2 is a perspective view of one form of the centralizing device.

Referring to Fig. 2, one embodiment of the invention is shown as comprising a base member 1 in the form of a ring, providing a plurality of recesses 2 in which are mounted flexible arms or supports 3 extending from the ring 1 at points suitably spaced around its periphery. Each of the arms 3 carries a pair of spaced enlarged work engaging portions 4, preferably spherical in form, although this shape may be varied somewhat if desired. As will hereinafter appear, the diameter of the ring 1 for a given device is determined by the pitch diameter of the gear to be held, while the size of the work engaging portions 4 is determined by the circular pitch of the gear teeth.

Figure 1:
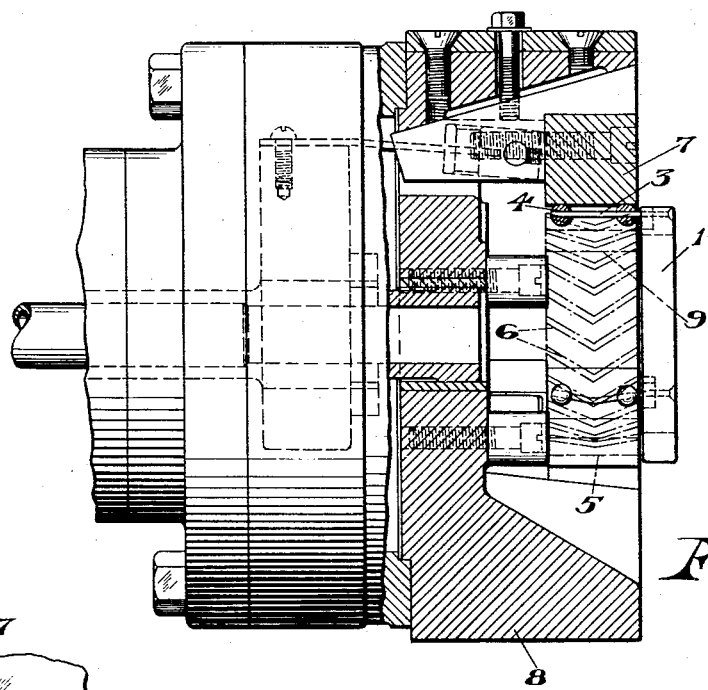
Fig. 1 is a view, partly in section, showing a gear held in a suitable chuck by means of the centralizing device.

In use, the device is slipped over a gear 5, shown in dotted lines in Fig. 1, with the ring 1 substantially engaging the side of the gear and the arms 3 extending over the faces of the gear teeth 6. With the ring 1 so positioned, the spherical portions 4 on the arms 3 lie between adjacent gear teeth 6 and engage opposed faces of the teeth substantially at the pitch line, the flexibility of the arms 3 permitting the portions 4 to readily position themselves between the teeth 6. The teeth engaging portions 4 are spaced apart on the arms 3 somewhat less than the width of the gear face, in order that their points of contact with the teeth 6 will be on opposite sides of the transverse axis of the gear.

Figure 4:
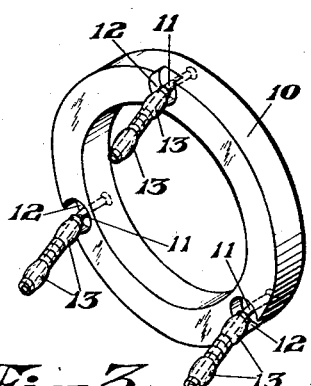
Fig. 4 is a fragmentary view illustrating the cooperation of the device with the teeth of a gear.

The number and spacing of the arms 3 coincides with the number and spacing of the radially movable jaws 7 of a chuck 8 of usual construction, shown in Fig. 1, so that when a gear 5 held by the arms 3 is placed in the chuck 8 and the jaws 7 contracted, the portions 4 will simultaneously engage the gear teeth 6 and hold the gear firmly in position. And since the spherical portions 4 engage the gear teeth 6 around the pitch circle, as shown in Fig. 4, the surfaces of these portions 4 engage all the chuck jaws 7 at the same distance from the center of the pitch circle. Consequently, any grinding or cutting operations performed on the interior of the central opening 9 of the gear 5, as the chuck rotates, will be absolutely concentric, or coaxial, with the pitch circle of the teeth 6.

Figure 3:
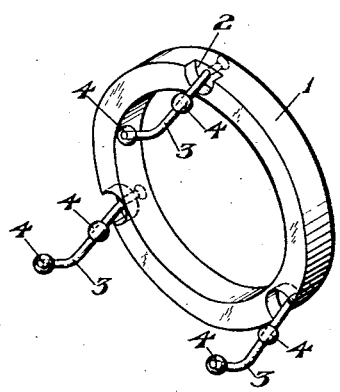
Fig. 3 is a view similar to Fig. 2 showing a modification of the device.

Referring to the embodiment shown in Fig. 3, a ring 10 supports flexible arms 11 similar to the arms 3 of Fig. 2, and is cut away at 12 in a similar manner. Each arm 11 carries spaced ellipsoidal portions 13, that are particularly adapted for use with gears of soft steel or cast iron, since the ellipsoidal portions 13 by their line contact permit engagement with greater areas of the gear teeth than in the previously described construction, although the spherical portions 4 operate best on gears of hardened material. The centralizing device of Fig. 3 is applied to a gear in the same manner as described with reference to the device shown in Fig. 2.

When utilizing gear centralizing devices embodying the present invention, it is necessary to provide a variety of sizes corresponding to the various pitch diameters of workpieces to be operated upon, the work contacting portions 4 and 13, in each case, being of such size as to contact with the gear teeth at the pitch line. When it is desired to centralize a given gear, or workpiece, a device is selected of the proper diameter with work contacting portions of the size required for the teeth, after which the flexible arms 3 or 11 are adjusted to suit the angularity of the gear teeth, if any. In making such adjustments, the recesses 2 or 12 permit the flexible arms to be bent with a comparatively large radius at the points where they are held by the rings, thus eliminating the danger of breaking the arms by repeated bendings. Obviously, when centralizing straight toothed gears, the arms must be straight.

I claim,

1. A device for centering a gear comprising a base member, a plurality of flexible arms extending from said base, and spaced enlarged portions on said arms substantially circular in cross section and adapted to engage with teeth on a gear substantially at the pitch line.

2. A device for centering a gear in a clamping device comprising a base member, a plurality of flexible arms extending from the said base, and a plurality of members carried by said arms engageable between teeth on said gear and the clamping device, said members being so spaced as to engage the gear teeth at different points around the pitch circle.

3. A device for clamping a gear in a clamping device comprising a base member adapted to engage one surface of a gear, flexible arms carried by said base adapted to extend along the teeth of said gear, and spaced, substantially spherical portions mounted on each of said arms adapted to engage between said teeth and the clamping member, the diameter of the spaced portions being such as to engage the gear teeth substantially at the pitch line.

4. A device for centering a gear in a clamping device comprising a ring, a plurality of recesses in said ring, a plurality of flexible arms mounted in said recesses, and a plurality of spaced work engaging portions carried by said arms.

5. A device for centering a gear in a clamping device comprising a base, a plurality of flexible arms, and a plurality of enlarged portions on said arms adapted to engage the teeth of a gear by a plurality of point contacts around the pitch line.

6. A device of the class described, comprising an annulus, a plurality of flexible supporting arms extending from said annulus, recesses in said annulus within which said flexible arms are mounted, said recesses being larger than said arms, whereby said arms are capable of angular adjustment, and enlarged work engaging portions on said arms.

7. A device for centering a gear in a clamping device comprising a base member, a plurality of flexible arms extending from said base, and a plurality of spaced members carried by each of said arms for engagement between adjacent teeth on said gear, said members being substantially circular in cross-section, the members on each arm being arranged to engage said gear adjacent opposite edges thereof.

GHERALD D. SCOTT.